United States Patent [19]

Makarov et al.

[11] Patent Number: 4,905,419

[45] Date of Patent: Mar. 6, 1990

[54] DEVICE FOR AUTOMATIC BALANCING OF GRINDING WHEEL

[76] Inventors: Oleg A. Makarov, ulitsa generala Khazova, 8, kv. 9, Leningradskaya oblast, Pushkin; Vladimir I. Nisenman, prospekt Lenina 29, kv. 66, Lipetsk; Vadim I. Pryadilov, ulitsa Budapeshtskaya, 31, korpus 1, kv. 16; Juris P. Tsimansky, ulitsa M. Kazkova, 10, korpus 1, kv. 534, both of Leningrad, all of U.S.S.R.

[21] Appl. No.: 283,368

[22] PCT Filed: Mar. 19, 1987

[86] PCT No.: PCT/SU87/00033

§ 371 Date: Nov. 7, 1988

§ 102(e) Date: Nov. 7, 1988

[87] PCT Pub. No.: WO88/07186

PCT Pub. Date: Sep. 22, 1988

[51] Int. Cl.$^4$ .............................................. B24B 41/00
[52] U.S. Cl. .................................. 51/169; 51/165.87; 74/573 F
[58] Field of Search ............................ 51/169, 165.87; 74/573 F; 73/66, 68

[56] References Cited

U.S. PATENT DOCUMENTS 3,950,897 4/1976 Birkenstack et al. ................. 51/169
4,688,355 8/1987 Menigat et al. ........................ 51/169

FOREIGN PATENT DOCUMENTS 3503724 8/1986 Fed. Rep. of Germany .
381941 8/1973 U.S.S.R. .
619814 6/1978 U.S.S.R. .
729458 4/1980 U.S.S.R. .
741079 6/1980 U.S.S.R. .
1221521 3/1986 U.S.S.R. .

*Primary Examiner*—Frederick R. Schmidt
*Assistant Examiner*—M. Rachuba
*Attorney, Agent, or Firm*—Fleit, Jacobson, Cohn, Price, Holman & Stern

[57] ABSTRACT

A device for automatic balancing of a grinding wheel (2) mounted on a spindle (3) comprises an unbalance correction mechanism made as a housing (5) having chambers ($7_1$, $7_2$, $7_3$) connected to a source of fluid (19) through a distributor unit (9) made as hydraulic valves (10) provided with electromagnetic drives ($12_1$, $12_2$, $12_3$), pickups ($17_1$, $17_2$, $17_3$) of position of the chambers, said pickups being mounted on a machine base (4), an unbalance transducer (1) connected to an amplifier-shaper (13). The output of the amplifier-shaper (13) is connected to a common input of a coincidence gate (16) the other inputs of which and the output are connected respectively to the outputs of the pickups ($17_1$, $17_2$, $17_3$) of position of the chambers ($7_1$, $7_2$, $7_3$) and to the input of the distributor unit (9), while the unbalance correction mechanism is provided with at least one marker (21).

6 Claims, 5 Drawing Sheets

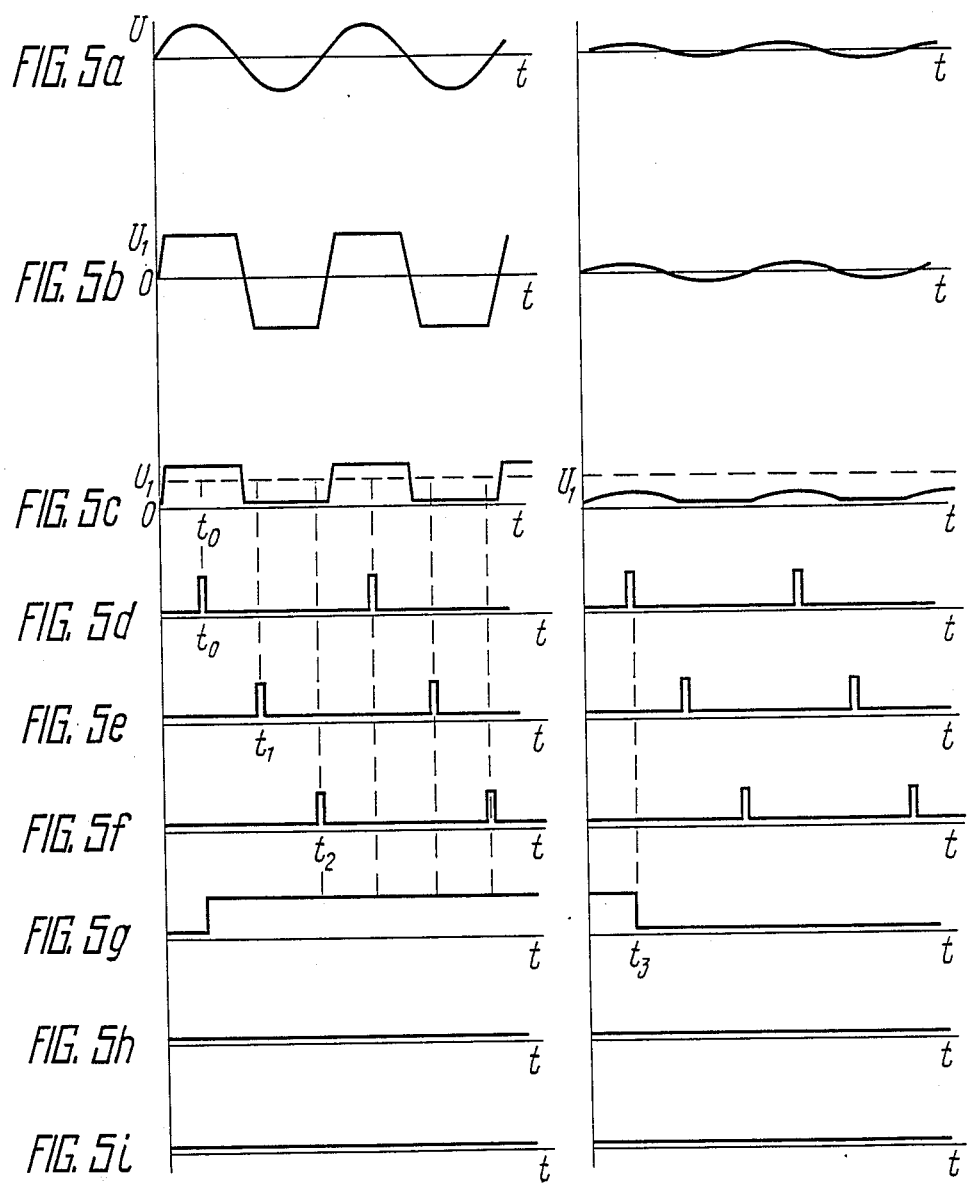

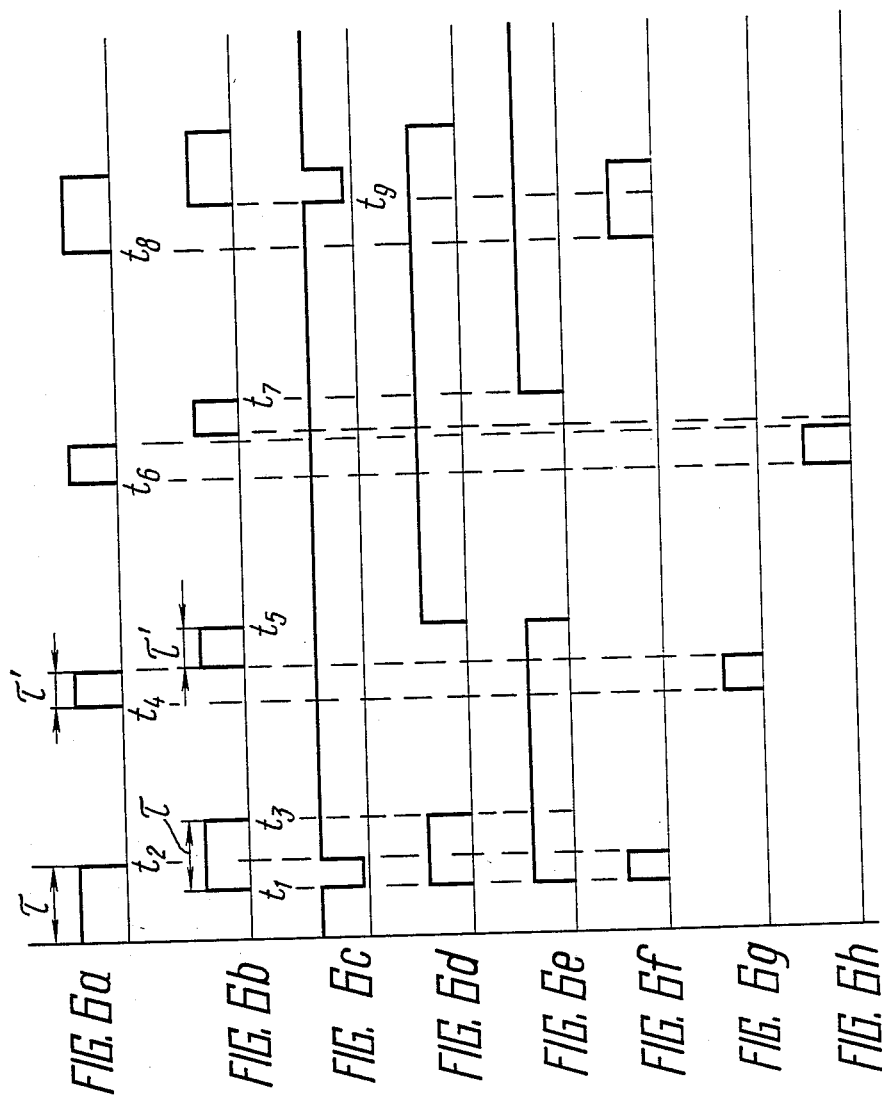

DEVICE FOR AUTOMATIC BALANCING OF GRINDING WHEEL

TECHNICAL FIELD

The invention relates generally to measurement technology and more specifically it concerns devices for automatic balancing of a grinding wheel mounted on the spindle of a grinding machine.

BACKGROUND OF THE INVENTION

Known in the present state of the art is a device for automatic balancing of grinding wheels (cf. SU,A, No. 381941) mounted on the spindle of a grinding machine, said device comprising an unbalance transducer, an unbalance correction mechanism controlled by the aforesaid transducer and provided with four chambers spaced equidistantly along the rotor perimeter and partly filled with a fluid. Each pair of the diametrically opposite chambers intercommunicates through a passage and is connected to acompressed air source through a distributor unit incorporating an electric drive and flow-regulating valves. To correct grinding wheel unbalance, fluid is conveyed, by virtue of compressed-air pressure, from one chamber into another until the electric drive of the distributor unit is switched off.

However, the device discussed above is too sophisticated in manufacture. Besides, it suffers from an inadequate degree of automation, which affects adversely its operating reliability.

One more prior-art device for automatic balancing of grinding wheel (cf. SU, A, 619814) mounted on the spindle of a grinder is known to comprise an unbalance correction mechanism which is in fact a cylinder-shaped housing set on the grinder's spindle and subdivided into compartments or chambers spaced equidistantly therein along its periphery, and a distributor unit shaped as a plurality of air-piloted hydraulic valves arranged in the correction mechanism opposite to the chambers thereof. The distributor unit communicates, via passages, with the sources of fluid and compressed air through an adapter mechanism which is to communicate the rotatable fluid and air admission passages or ducts with the stationary sources of fluid and air. The hydraulic valves of the distributor unit are connected to their respective unbalance transducers which are in effect air-operated. The nozzles of the unbalance transducers are located in the housing of the correction mechanism, while a ring-shaped flap common to all transducers, is mounted on the grinder base.

It is a due to out-of-balance mass of the grinding wheel, that is, its unbalance, that the spindle axis is urged by the centrifugal force to displace towards the unbalanced wheel side, thus changing the clearance between the flap outer surface and the unbalance transducer nozzles, which in turn increases or decreases the pressure effective in the compressed air admission passage, which pressure actuates the air drive of a respective hydraulic valve so that the latter either opens or closes, thereby controlling the rate of fluid flow to the chamber involved.

However, such a construction arrangement of the aforediscussed known device is too sophisticated, since it necessitates compressed air admission to the rotatable housing to control distribution and supply of fluid to the chambers of the correction mechanism, which affects adversely the operating reliability of the device.

In addition, the presence of a grinding wheel unbalance which is to be corrected, is judged by the amount of displacement of the axis of spindle rotation from its geometrical axis, said displacement being caused by a centrifugal force resulting from rotation of out-of-balance masses of the grinding wheel. Such a displacement or offset effective in modern grinders is a rule of the order of 0.2 $\mu$m. However, the values of the aforesaid order lie out of the zone of tolerance for the mating components of the nozzles and flap of the unbalance transducer, on which account the sensitivity of the unbalance transducer fails to meet the requirements imposed upon the accuracy of measurement of the amounts of the spindle geometrical axis offset from the axis of spindle rotation, which also affects badly the reliability of balancing.

SUMMARY OF THE INVENTION

The main object of the present invention is to provide a device for automatic balancing of grinding wheel which would feature such a construction and control scheme for distribution of fluid in the chamber of the correction mechanism that would make unnecessary the use of an unbalance transducer of the air-operated type, as well as feed of compressed air into the correction mechanism, thereby adding to the wheel balancing accuracy and to the reliability of the device, the degree of automation of the balancing process remaining unaffected.

Said object is accomplished due to the fact that a device for automatic balancing of a grinding wheel mounted on the spindle of a grinder, comprising an unbalance transducer, and an unbalance correction mechanism fashioned as a spindle-mounted cylinder-shaped housing having N chambers equidistantly spaced therein along its perimeter, and a distributor unit communicating with said chambers and associated with a source of fluid, N being equal to or in excess of 3, according to the invention, is also provided with an amplifiershaper connected to the output of the unbalance transducer which converts mechanical vibrations into an electric signal or pulse in order to obtain an unbalance signal in the form of a double-level periodic signal, as well as with at least one marker rigidly coupled to the unbalance correction mechanism, with at least two position pickups of the housing chambers, said pickups being located on the machine base and adapted to produce position pulses of the chambers when the marker passes by the position pickups, and with a coincidence gate whose outputs are connected to the inputs of the distributor unit, while its common input is connected to the output of the amplifier-shaper and its other inputs are electrically connected to the outputs of the position pickups, said coincidence gate being adapted to produce a control signal for fluid to admit to a respective chamber in response to time-coincidence of the chambers' position pulses with the active level unbalance signal, said distributor unit being made as N solenoid-operated hydraulic valves adapted to open in response to a controlled signal applied to the inputs thereof.

It is advisable that in a device for automatic balancing of a grinding wheel, according to the invention, the function of the unbalance transducer be performed by an accelerometer placed on the machine base, and the amplifier-shaper be fashioned as seriesconnected an amplifier-limiter and a half-wave rectifier.

It is quite practicable that provision be made in a device, according to the invention, for N position pickups of the housing chambers, situated on the machine base and spaced equidistantly round the spindle.

It is favourable, from the standpoint of higher reliability, that in a device, according to the invention, N markers be provided on the machine spindle, spaced equidistantly on the housing of the correction mechanism, and two chambers' position transducers be provided, whose outputs are connected, through a switching device, to the inputs of the coincidence gate for alternately delivering chambers' position pulses.

It is possible that in a device, according to the invention, the coincidence gate be made as D-flip-flops equal in number to N chambers, and that D-inputs of the D-flip-flops be connected to a common input of the coincidence gate, while the other inputs of said gate be C-inputs of the D-flip-flops.

It is also permissible that in a device, according to the invention, the coincidence gate incorporates N AND-AND logic gates connected to N integrating circuits so that one input of each AND-AND logic gate be connected to the common input of the coincidence gate whose other inputs serve as other inputs of the AND-AND logic gates, and the outputs of the integrating circuits be the outputs of the coincidence gate.

The invention proposed herein makes it possible to increase operating reliability of the device for automatic balancing of grinding wheels and to add to its accuracy due to the provision made in the construction of the device, for an unbalance transducer adapted to convert mechanical vibrations into an electric signal, as well as due to introduction of an electronic circuit for processing said electric signal, which operates on a fully automatic cycle and enables one to carry out accurate determination of those chambers of the correction mechanism to while fluid should be delivered till complete correction of unbalance.

BRIEF DESCRIPTION OF DRAWINGS

Said and other objects and advantages of the invention will become more apparent from a detailed description of a specific embodiment thereof with reference to the accompanying drawings, wherein:

FIGS. 5a through 5i represent operating time charts of the device, according to the invention; and FIGS. 6a through 6h represent operating time charts of the switching device, according to the invention.

BEST MODE FOR CARRYING OUT THE INVENTION

Figure 1:
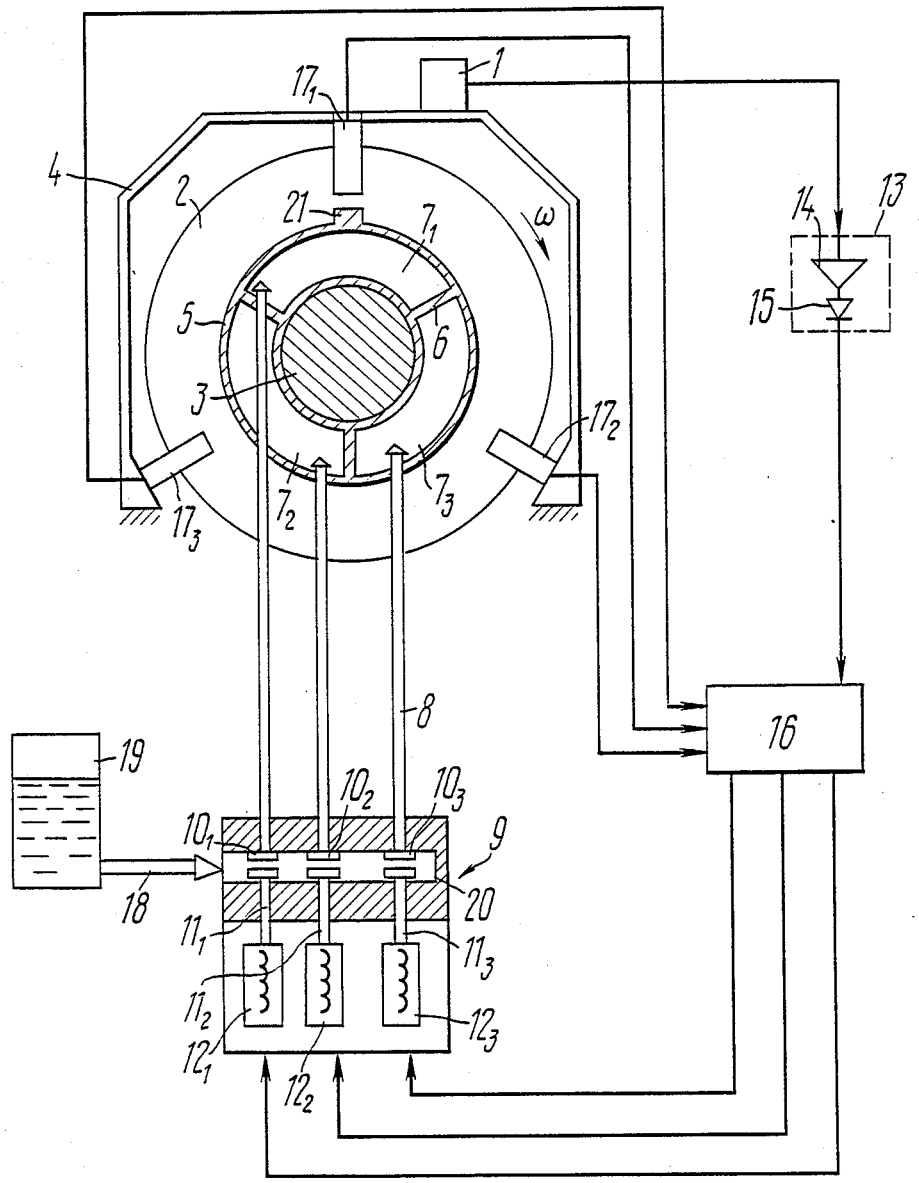
FIG. 1 is a functional diagram of a device for automatic balancing of a grinding wheel, according to the invention.

The device for automatic balancing of a grinding wheel comprises a transducer 1 (FIG. 1) adapted to pick up unbalance of a grinding wheel 2 mounted on a spingle 3 of a grinding machine.

The unbalance transducer 1 is located on machine base 4 and is adapted for converting mechanical oscillations imparted by the grinding wheel 2 to the base 4, into an electric pulse. The device comprises also an unbalance correction mechanism made as a cylinder-shaped housing 5 mounted on the spindle 3 and divided, by radial partitions 6, into N chambers $7_1$–$7_N$ (in this particular case N being equal to three) spaced equidistantly along the perimeter of the housing 5. The chambers $7_1$ to $7_3$ communicate, through pipings 8, which a distributor 9 made as N, i.e., three hydraulic valves $10_1$, $10_2$, $10_3$ kinematically associated, through rods $11_1$, $11_2$, $11_3$, with electromagnetic drives $12_1$, $12_2$, $12_3$. The output of the unbalance transducer 1 is connected to the input of an amplifier-shaper 13, which is made in this particular case as series-connected an amplifier-limiter 14 and a half-wave rectifier 15. The output of the amplifier-shaper 13 is connected to a common input of a coincidence gate 16 whose other inputs are connected to N, i.e., three pickups $17_1$, $17_2$, $17_3$ of position of the chambers $7_1$ to $7_3$, said pickups being located on the base 4. The outputs of the coincidence gate 16 are connected to the inputs of the electromagnetic drives $12_1$, $12_2$, $12_3$ of the distributor unit 9, which communicates, through a piping 18, with a source 19 of fluid entering a common conduit 20 of the distributor unit. Secured on the housing 5 of the unbalance correction mechanism is a marker 21 made as a projection so that the pickups $17_1$ to $17_3$ generate a position pulse when said projection passes by the pickups.

The unbalance transducer 1 in conjunction with the amplifier-shaper 13 is adapted to produce an unbalance signal in the form of a double-level periodic signal, while the coincidence gate 16 is for generating a control signal when the pulses of position of the chambers $7_1$ to $7_3$ coincide with the active level unbalance signal impressed upon the distributor unit 9 for fluid to admit to the respective chamber $7_1$ to $7_3$.

Employed as the unbalance transducer 1 may be any heretofore-known vibration transducer capable of converting mechanical vibrations or oscillations into an electric pulse (cf. a reference book 'Vibration in engineering practice', vol. 5, Maschinostoyeniye Publishers, Moscow, 1981, p. 209 (in Russian).

However, most expedient from the viewpoint of sensitivity to mechanical oscillations seems to be the use, as the unbalance transducer 1, of an accelerometer at whose output a sinusoidal electric pulse appears in response to mechanical oscillations, said pulse featuring its amplitude varying in dependence with the amount of unbalance. The amplifier-limiter 14 having high amplification coefficient 'k' (of the order of $1.10^5$) and adapted to increase the amplitude of the output signal of the transducer 1, is built around a commonly known circuit. To attain higher balancing accuracy it is desirable that the amplification coefficient 'k' should be as high as possible. The half-wave rectifier 15, e.g., a diode is intended for shaping the unbalance signal in the form of a double-level periodic signal.

The amplifier-shaper 13 may be based on any other known circuit design (cf. 'Balancing of rotatable masses of gyroscopic instruments' by A. B.Skvorchevsky and N. B.Promyslov, Sudostroyeniye Publishers, Leningrad, 1977, pp. 142, 146 (in Russian).

The marker 21 may be made either as a projection of or a depression in the housing 5. In this case used as the position pickups $17_1$, $17_2$, $17_3$ may be contactless electric devices (cf. 'Polytechnic Dictionary', Sovetskaya Entsiklopediya Publishers, Moscow, 1980, p. 53 (in Russian). The marker 21 may be made by applying a contrast paint to the outside surface of the housing 5. Should such be the case use must be made, as the position pickups $17_1$ to $17_3$, of photosensors incorporating a light source and a photodiode (cf. A. B. Skvorchevsky, N. B. Promyslov, op. cit., pp. 145, 151).

Figure 2:
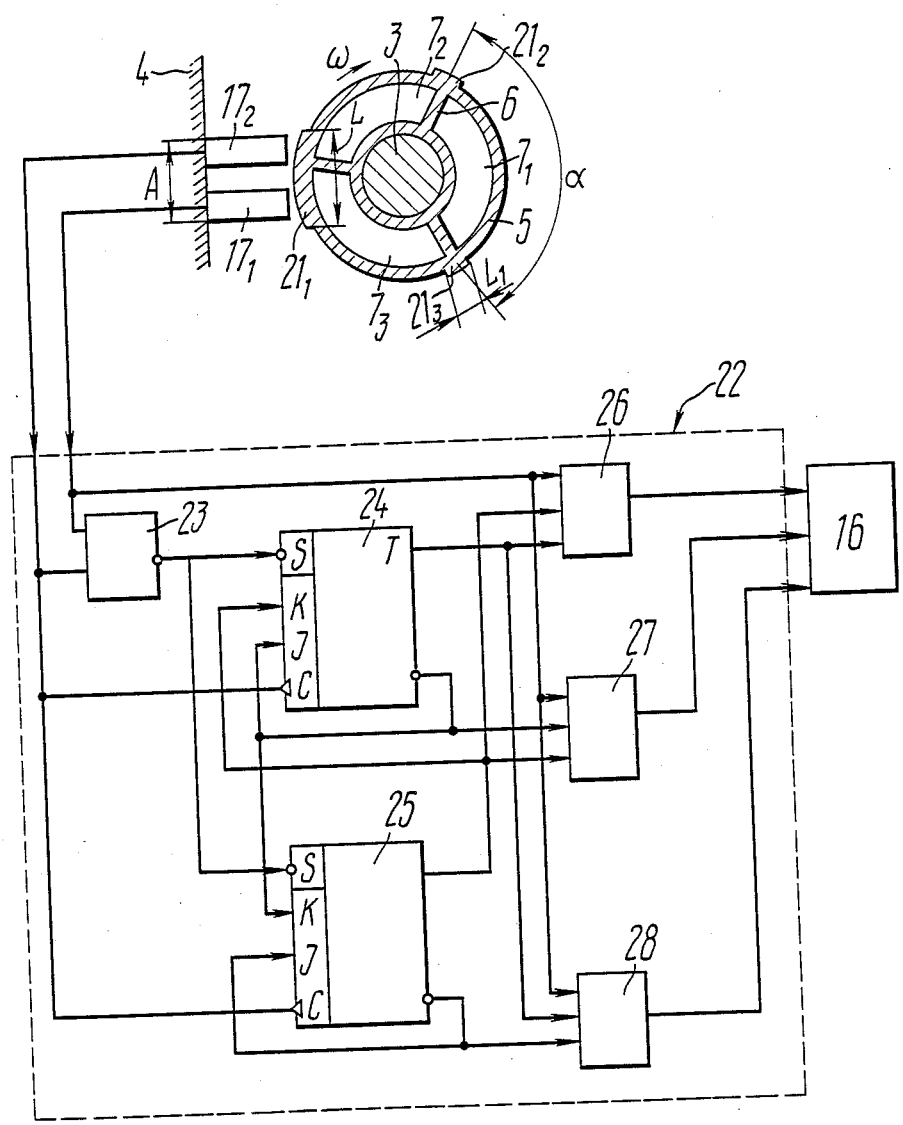
FIG. 2 is an electric diagram of the switching device connected to two chambers' position pickups, according to the invention.

It can be seen from FIG. 2 that the device proposed herein is provided with two position pickups $17_1$ and $17_2$ situated on the base 4. N, i.e., three markers $21_1$, $21_2$, $21_3$ are provided on the side surface of the housing 5 of the unbalance correction mechanism, which markers are spaced apart equiangularly, i.e., at an angle $\alpha$ equal to 120°. One of the markers $21_1$ features its length 'L' not shorter than a distance 'A' between the position pickups $17_1$ and $17_2$. The rest of the markers $21_2$, $21_3$ have a length $L_1$ equal to or less than A/2.

The length 'L' of the marker $21_1$ is selected in order to set the point of origin and determine exactly an unambiguous correspondence of each of the markers $21_1$, $21_2$, $21_3$ to its respective chamber $7_1$, $7_2$, $7_3$. The outputs of the pickups $17_1$, $17_2$ are connected to the inputs of switching device 22, whose outputs are connected to the inputs of the coincidence gate 16. The switching device 22 incorporates a NAND-NAND logic gate 23 adapted to set the point of origin, two JK-flip-flops 24, 25 performing the function of a position pulse counter, and three AND-AND-AND logic gates 26, 27, 28 serving as a decoder of the states of the JK-flip-flops 24, 25. The first inputs of all the logic gates 23, 26, 27, 28 are connected to one input of the switching device 22, while connected to the other input of said device are the second input of the NAND-NAND logic gate 23 and the C-inputs of the JK-flip-flops 24, 25 whose inverting S-inputs are connected to the output of the NAND-NAND logic gate 23. The noninverted output of the JK-flip-flop 24 is connected to the other inputs of the AND-AND-AND logic gates 26, 28, while the inverting output of the JK-flip-flop 24 is connected to its J-input which in turn is connected to the K-input of the JK-flip-flop 25, and to the other input of the AND-AND-AND logic gate 27. The noninverting input of the JK-flip-flop 25 is connected to the remaining inputs of the AND-AND-AND logic gates 26, 27 and to the K-input of the JK-flip-flop 24, while the inverting output of the JK-flip-flop 25 is connected to its J-input and to the remaining input of the AND-AND-AND logic gate 28. The outputs of the AND-AND-AND logic gates 26, 27, 28 are connected to the inputs of the coincidence gate 16. Using two position pickups $17_1$, $17_2$ one can shape N (three) trains of position pulses, unlike an embodiment shown in FIG. 1, wherein there is necessary to have N position pickups $17_1$, $17_2$, $17_3$.

Figure 3:
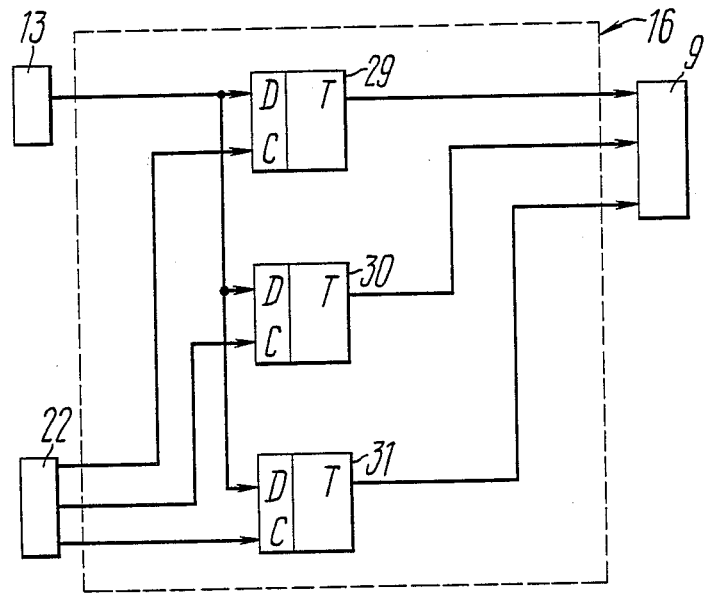
FIG. 3 is a coincidence gate built around D-flip-flops, according to the invention.

FIG. 3 represents the coincidence gate 16, comprising N (three) D-flip-flops 29, 30, 31, whose D-inputs are connected to a common input of the coincidence gate 16, and the C-inputs are connected to the other inputs of the coincidence gate. The D-outputs of the flip-flops 29, 30, 31 are at the same time the outputs of the coincidence gate 16.

Figure 4:
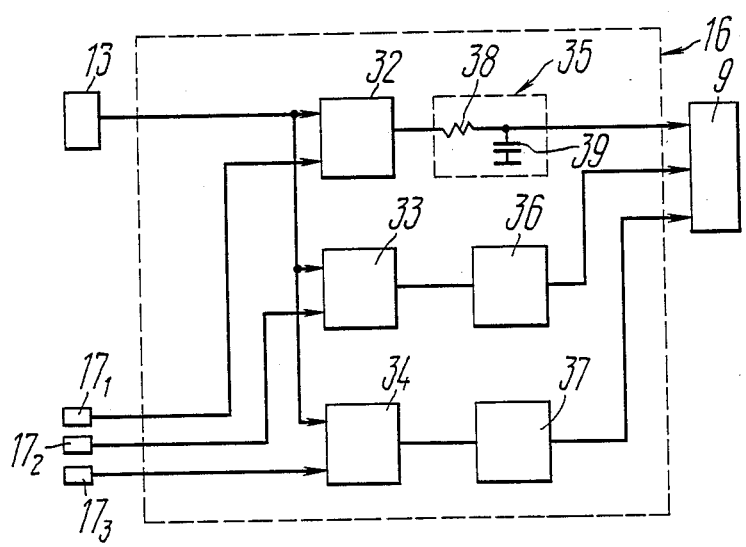
FIG. 4 is a coincidence gate built around AND-AND logic gates and integrating circuits, according to the invention.

According to the embodiment illustrated in FIG. 4, the coincidence gate 16 incorporates N (three) AND-AND logic gates 32, 33, 34 whose outputs are connected to integrating circuits 35, 36, 37 which are in effect conventional RC-circuits comprises of a resistor 38 and a capacitor 39, the outputs of both serving as the outputs of the coincidence gate 16. One of the inputs of each AND-AND logic gate 32, 33, 34 is connected to a common input of the coincidence gate 16, whose other inputs are in fact the other inputs of the AND-AND logic gates 32, 33, 34.

The embodiment of the coincidence gate 16 illustrated in FIG. 3 is believed to be preferable (out of the two embodiments proposed) as the simplest in circuit design and requiring no adjustment necessary for the integrating RC-circuits 35, 36, 37 (FIG. 4) and hence featuring the maximum reliability.

FIG. 5 represents time charts 'a', 'b', 'c', 'd', 'e', 'f', 'g', 'h', 'i' that describe operation of the device proposed herein. The start of the balancing process is illustrated in the left-hand portion of the charts 'a' through 'i', the end of that process, in the right-hand portion of said charts. Here the chart 'a' depicts a signal appearing at the output of the unbalance transducer 1 (FIG. 1), the chart 'b' (FIG. 5) represents a signal at the output of the amplifier-limiter 14 (FIG. 1), the chart 'c' (FIG. 5) shows an unbalance signal, i.e., a double-level periodic signal appearing at the output of the amplifier-shaper 13 (FIG. 1), that is, at the common input of the coincidence gate 16, wherein the active level is in fact the high level. The charts 'd', 'e', 'f'(FIG. 5) illustrate the trains of position pulses impressed upon the other inputs of the coincidence gate 16 (FIG. 1).

The chart 'g' (FIG. 5) indicates a control signal coming from one of the outputs of the coincidence gate 16 (FIG. 1) and impressed upon one of the inputs of the distributor unit 9. The charts 'h' and 'i' (FIG. 5) are characteristic of an absence of control signals at the other outputs of the coincidence gate 16 (FIG. 1).

FIG. 6 represents the operating time charts 'a', 'b', 'c', 'd', 'e', 'f', 'g', 'h' of the switching device 22 (FIG. 2). Here the charts 'a' and 'b' illustrate the trains of position pulses appearing at the outputs of the pickups $17_1$ (FIG. 2) and $17_2$, respectively, while the chart 'c' (FIG. 6) shows a signal appearing at the output of the AND-AND logic gate 23 (FIG. 2). The charts 'd' and 'e' (FIG. 6) illustrate signals appearing at the noninverting outputs of the JK-flip-flops 24 (FIG. 2) and 25, while the charts 'f' (FIG. 6), 'g', and 'h' indicate the position pulses of the chambers $7_1$ to $7_3$ (FIG. 2) appearing at the inputs of the coincidence gate 16.

The device for automatic balancing of a grinding wheel operates as follows.

When out-of-balance masses (unbalance) of the grinding wheel 2 occurs, the unbalance transducer 1 (FIG. 1) converts mechanical oscillations of the base 4 and hence of the grinding wheel 2, into a periodic electric pulse (refer to the chart 'a' in FIG. 5) having a frequency equal to rotation frequency of the spindle 3 (FIG. 1) and arriving at the input of the amplifier shaper 13 which converts and amplifies this signal (refer to the chart 'b' in FIG. 5) in the amplifier-limiter 14 (FIG. 1), and converts the thus-amplified signal, with the aid of the half-wave rectifier 15, into an unbalance signal (see the chart 'c' in FIG. 5) in the form of a double-level periodical signal having the same frequency and arriving at the common input of the coincidence gate 16 (FIG. 1). While passing by the pickups $17_1$ to $17_3$ the marker 21 causes a position pulse to appear the output of each of the pickups $17_1$ to $17_3$ (refer to the charts 'd', 'e', 'f' of FIG. 5), which position pulses are impressed upon the other inputs of the coincidence gate 16 (FIG. 1). When the appearance of a position pulse coincides in time with the active level (i.e., the 'one' level) of the unbalance signal, an active level (i.e., the 'one' level in this particular case) of the control signal is set at the respective output of the coincidence gate 16 (refer to the chart 'g' of FIG. 5). When the appearance of a position pulse coincides in time with the zero level of the unbalance signal, a 'zero' level of the control signal is set at the respective output of the coincidence gate 16 (FIG. 1) (refer to the charts 'h' and 'i' of FIG. 5). This can easily be explained by taking as an example the embodiment of the coincidence gate 16 (FIG.3), incorporating the D-flip-flops 29, 30, 31. In this particular case a signal appears at the output of each D-flip-flop 29, 30, 31 having the same level as the signal appearing at the D-input of each of said flip-flops in response to a position pulse arriving at the C-input thereof, that is, a control signal of the 'one' level appears at the output of the D-flip-flop 29 (refer to the chart 'g' of FIG. 5), while a control signal of the 'zero' level appears at the outputs of the D-flip-flops 30 (FIG. 3), 31 (refer to the charts 'h', 'i' of FIG. 5). In the case where the coincidence gate 16 (FIG. 4) is based on the AND-AND logic gates 32, 33, 34 and the integrating circuits 35, 36, 37, a pulse appears at the outputs of those AND-AND logic gates 32, 33, 34 at the inputs of which there appear simultaneously position pulses (the point $t_o$ in the chart 'd' of FIG. 5) and an unbalance signal of the active ('one') level (refer to the chart 'c' of FIG. 5), that is, at the output of the AND-AND logic gate 32 in this particular case, said, pulse following the position pulse, which is then converted, with the aid of the integrating circuit 35, 36, or 37 (the circuit 35 is involved in this particular case), into a 'one' level signal (refer to the chart 'g' of FIG. 5), which is in effect the signal that controls the admission of fluid. When the position pulses coincide with the zero-level unbalance signal (the points $t_1$ and $t_2$ in the charts 'e' and 'f' of FIG. 5), a zero-level control signal appears at the output of the logic gates 33 (FIG. 4), 34 and hence at the output of the integrating circuits 36, 37 (refer to the charts 'h', 'i' of FIG. 5). Then the control signals from the output of the coincidence gate 16 (FIG.1) are delivered to the distributor unit 9, wherein the one-level control signal brings the respective electromagnetic drive $12_1$ to the operative state, while the zero-level control signal deenergizes the other electromagnetic drives $12_2$, $12_3$.

The electromagnetic drive $12_1$ turned on by the aforesaid control signal, causes the hydraulic valve $10_1$ to open while acting through the rod $11_1$.

Working fluid (e.g., water or oil) fed from the source 19, is admitted to pass, via the open hydraulic valve $10_1$ to the chamber $7_1$ as long as the one-level control signal appears at the input of the electromagnetic drive $12_1$.

Once the amplitude of a signal coming from the unbalance transducer 1 has been decreased, a zero-level unbalance signal appears at the output of the amplifier-shaper 13 (refer to the left-hand portion of the chart 'c' of FIG. 5), falling below the threshold of sensitivity of the coincidence gate 16 indicated with a line $U_1$, so that when a next position pulse of the chamber $7_1$ (FIG. 1) appears (refer to the chart 'd' of FIG. 5), the level of a control signal appearing at the output of the coincidence gate 16 (FIG. 3), that is, at the output of the D-flip-flop 29, becomes zero, with the result that feed of fluid to the chamber $7_1$ (FIG. 1) ceases (the point $t_3$ in the right-hand portion of the chart 'g' in FIG. 5).

Now let us proceed to consider the operation of the switching device 22 (FIG. 2). With the grinding wheel 2 (FIG. 1) rotating in the direction indicated with the arrow $\chi$ in FIG. 2, the markers $21_1$ to $21_3$ (FIG.2) pass successively by the position pickups $17_1$, $17_2$, whereby the latter generate the trains of position pulses (refer to the charts 'a', 'b' of FIG. 6) phase-shifted with respect to each other, since the pickups $17_1$ and $17_2$ are spaced a distance 'A' apart. One of the position pulses in each train that results from the passing of the marker $21_1$ having the length 'L', will feature a width '$\tau$' which exceeds a width '$\tau$' of the other position pulses of the same train. When the position pulses having the width of both pulse trains coincide in time (refer to the poins $t_1$ and $t_2$ in the charts 'a' and 'b' of FIG. 6) and are impressed upon the inputs of the NAND-NAND logic gate 23 (FIG. 2), a count pulse appears at the output of the aforesaid gate (refer to the chart 'C' of FIG. 6), which pulse is impressed upon the S-inputs of the JK-flip-flops 24, 25, thus throwing them into the 'one' state which, while being transferred to one of the inputs of the AND-AND-AND logic gate 26 (provided a pulse from the pickups $17_1$ (FIG. 2) appears at the other inputs thereof (refer to the chart 'a' of FIG. 6), causes a similar pulse (refer to the chart 'f' of FIG. 6) to appear at the output of the AND-AND-AND logic gate 26 (FIG. 2) that is the pulse representing the position of the chamber $7_1$. The JK-flip-flop 24 is thrown into the zero state (refer the chart 'd' of FIG. 6), against the trailing edge of said pulse (the point $t_3$ in the chart 'b' of FIG. 6), whereas the JK-flip-flop 25 (FIG. 2) remains in the 'one' state (refer to the chart 'e' of FIG. 6). Then a next position pulse having the width $\tau$ (refer to the chart 'a' of FIG. 6) appears at the output of the pickup $17_1$ (FIG. 2) at the time instant $t_4$, which pulse is delivered from the input of the AND-AND-AND logic gate 27 (FIG. 2) (at the other inputs of which there appear some isolated pulses from the inverting output of the JK-flip-flop 24 and the non-inverting output of the JK-flip-flop 25) to the output of the AND-AND-AND logic gate 27 as a position pulse of (refer to the chart 'g' of FIG. 6) of the next chamber $7_2$ (FIG. 2). Next the JK-flip-flop 24 is thrown, with respect to its C-input into the 'one' state against the trailing edge of a next pulse (the point $t_5$ in the chart 'b' of FIG. 6) delivered by the pickup $17_2$ (FIG. 2), while the JK-flip-flop 25 is thrown into the 'zero' state (refer to the charts 'd' and 'e' of FIG. 6). A next pulse (refer to the chart 'a' ) delivered by the pickup $17_1$ (FIG. 2) appears at the point $t_6$ (FIG. 6), which pulse is applied, in a way similar to that described above for the point $t_4$ (FIG. 6), to the input of the AND-AND-AND logic gate 28 (FIG. 2), while at the two other inputs of said gate there appear isolated pulses from the inverting output of the JK-flip-flop 25 and the noninverting output of the JK-flip-flop 24, and appears at the output of the AND-AND-AND logic gate 28 as a position pulse (refer to the chart 'h' of FIG. 6) of the third chamber $7_3$ (FIG. 2). The JK-flip-flop 24 (FIG. 2) remains in the 'one' state, while the JK-flip-flop 25 resets from the 'zero' state to the 'one' state (refer to the charts 'd', 'e' of FIG. both actions being against the trailing edge of a pulse delivered by the pickup $17_2$ at the time point $t_7$ (FIG. 6). A pulse from the pickup $17_1$ (FIG. 2) appears at the point $t_8$ (refer to the chart 'a' of FIG. 6), which pulse is applied, in a way similar to that described above, to the output of the AND-AND-AND logic gate 26. A 'zero' pulse appears at the output of the AND-AND logic gate 23 at the time instant $t_9$ (FIG. 6) when the pulses of the greater width (refer to the charts 'a' and 'b') from the pickups $17_1$ (FIG. 2) and $17_2$ coincide, said 'zero' pulse supporting the 'one' state of the JK-flip-flops 24, 25 and, in case of malfunction, the 'zero' pulse causes either of the JK-flip-flops 24, 25 to be thrown positively into the 'one' state, which adds to the operating reliability of the entire circuitry. The pulses of position of the chambers $7_1$ to $7_3$ from the outputs of the switching device 22 are applied to the inputs of the coincidence gate 16 (FIG. 1), while an unbalance signal from the amplifier-shaper 13 is impressed upon the common input of the coincidence gate 16.

To provide faultless operation of the device for automatic balancing of a grinding wheel it is necessary first to adjust it with a view to correctly arrange the transducer 1 relative to the pickups $17_1$, $17_2$ ... $17_N$ (N=3), for which purpose the position pickups $17_1$ to $17_3$ are connected to the inputs of the coincidence gate 16, and the outputs of the latter gate are connected to the inputs of the electromagnetic drive $12_1$ to $12_3$ so that the trains of the position pulses read off the pickups $17_1$ to $17_3$ during rotation of the housing 5 of the correction mechanism should correspond to the sequence of passing of the centres of gravity of the chambers $7_1$ to $7_3$ through the same stationary fixed point of origin (fiducial point), e.g., located on the machine base at the place of installation of the pickup $17_1$. Then, without mounting the grinding wheel 2 and connecting the chambers $7_1$ to $7_3$ to the source 19 of fluid, one should set the spindle 3 in rotation and establish artificially induced unbalance by filling one of the chambers, e.g., the chamber $7_1$, with fluid. Next one should change the mutual arrangement of the unbalance transducer 1 and the pickups $17_1$ to $17_3$, or change the position of the marker 21 so as to seek after turning in (opening) of the hydraulic valves $10_2$ and $10_3$ communicating with the empty chambers $7_2$ and $7_3$, thus registering the open state of the hydraulic valves with the aid of visual indicators, e.g., lights (omitted in the Drawing), connected in parallel to the electromagnetic drives $12_1$ to $12_3$. Coming on of the lights is indicative of a correct mutual arrangement of the transducer 1, the pickups $17_1$ to $17_3$ and the marker 21. In this case a permissible angular accuracy of mutual arrangement of the pickups $17_1$ to $17_3$ equals $\pm 30°$ which, being though a considerable value, nevertheless does not affect the accuracy of the balancing process, which depends on the sensitivity alone of the unbalance transducer 1 and consequently low requirements to the adjustment accuracy does not affect a balancing accuracy, which adds to the reliability of the device as a whole.

Fine adjustment of the device can be carried out with the aid of a double-beam oscillograph (omitted in the Drawing), one of whose inputs is connected to the output of the amplifier-shaper 13, while the other input thereof is connected to the output of the pickup $17_1$ of position of the chamber $7_1$ (with the first chamber $7_1$ filled with fluid). In this case the pulse of position of the chamber $7_1$ should coincide with the midpoint of the zero half-cycle of the unbalance signal displayed on the oscillograph screen.

The former adjustment technique is the simplest one, while the latter provides for higher in-service operational reliability of the device, with possible displacements of the transducer 1 and the pickups $17_1$ to $17_3$ from the initial position.

The invention proposed herein makes it possible to employ as the unbalance transducer 1 any vibration transducer capable of converting mechanical oscillations into an electric signal and possessing high sensitivity meeting the requirements concerned with measurement of small amounts of offset of the geometric axis of the spindle 2 from the axis of its rotation in the case of unbalance. Once an electric signal picked up from the output of the unbalance transducer 1 has been amplified (by a factor of tenths thousand times) and the amplified signal has been converter in the amplifier-shaper 13, a possibility arises to obtain an unbalance signal as a double-level periodic signal which features high interference immunity towards extrinsic factors, which accounts for high operational reliability of the coincidence gate 16. Besides, inconsiderable occasional fluctuations of the amplitude of an electric signal appearing at the output of the transducer 1 do not affect operational reliability of the device for automatic balancing of the grinding wheel 2. Considerable occasional mechanical effects distorting the unbalance signal, do not affect both the accuracy and reliability of balancing, since the operation of the device is checked for correctness at each revolution of the grinding wheel 2.

The device incorporates only one rotatable component, i.e., the correction mechanism provided with the chamber 7, while the distributor unit 9 and the unbalance transducer 1 are fixed stationary on the base, which adds much to the operational reliability of the entire device for automatic balancing of a grinding wheel. It is due to the aforesaid feature that the device can easily be built into a machine-tool under manufacture or in an already operated machine-tool.

The coincidence gate 16 and the amplifier-shaper 13, being the principal control circuits of the device, are simple in respect to their components and can be based on standard elements, low in number, which also increases the operational reliability of the device.

The device proposed herein dispenses with a necessity for compressed air supply in order to admit fluid to the chambers $7_1$ to $7_3$, since fluid is fed to the chambers $7_1$ to $7_3$ with the aid of the hydraulic valves $10_1$ to $10_3$ which are actuated to open by the electromagnetic drives $12_1$ to $12_3$ depending on the level of a control signal, which makes it possible to further increase the operational reliability of the device.

Industrial Applicability

The proposed invention can find application in any machinery incorporating a revolving rotor, such as grinders and lathes of any type, centrifugal machines, engines, including turbine ones, whenever it is necessary to correct unbalance of rotatable components. When necessity arises to balance a rotor in several correction planes, a member of the correction mechanisms, according to the invention, can be provided on the rotor, each being controlled from an independent control scheme.

When use is made of a melt of solid materials (metal, epoxy resin, paraffin) as a fluid for filling the chambers, one can perform a signal balancing of a grinding wheel or any other rotatable component.

We claim:

1. A device for automatic balancing of a grinding wheel mounted on the spindle of a grinder, comprising an unbalance transducer (1), an unbalance correction mechanism fashioned as a cylinder-shaped housing (5) mounted on a spindle (3) and having N chambers ($7_1$–$7_N$) equidistantly spaced therein along its perimeter, and a distributor unit (9) communicating with said chambers and associated with a source (19) of fluid, N being equal to or in excess of 3, characterized in that it is provided with an amplifier - shaper (13) connected to the output of the unbalance transducer (1) in order to obtain an unbalance signal in the form of a double-level periodic signal with at least one marker (21) rigidly coupled to the unbalance correction mechanism, with at least two position pickups (17) of chambers ($7_1$-$7_N$) located on the machine base (4) and adapted to produce position pulses of the chambers ($7_1$-$7_N$) when the marker (21) passes by the position pickups (17), and with a coincidence gate (16) whose outputs are connected to the inputs of the distributor unit (9), while its common input is connected to the output of the amplifier-shaper (13) and its other inputs are electrically connected to the outputs of the position pickups (17), said coincidence gate being adapted to produce a control signal for fluid to admit to a respective chamber ($7_1$-$7_N$) in response to time-coincidence of the chambers' position pulses with the active level unbalance signal, said distributor unit (9) being made as N solenoid-operated hydraulic valves ($10_1$-$10_N$) with electromagnet drives ($12_1$-$12_N$) adapted to open solenoid-operated hydraulic valves ($10_1$-$10_N$) in response to a controlled signal applied to the inputs thereof, while the function of the unbalance transducer (1) is performed by one converting mechanical vibrations into an electric signal.

2. A device as claimed in claim 1 characterized in that the unbalance transducer (1) is made as an accelerometer mounted on the machine base (4), and the amplifier-shaper (13) is fashioned as series-connected an amplifier-limiter (14) and a half-wave rectifier (15).

3. A device as claimed in claim 1 characterized in that it is provided with chambers ($7_1$-$7_N$) position pickups ($17_1$-$17_N$) mounted on the machine base (4) equidistantly round the spindle (3).

4. A device as claimed in claim 1 characterized in that it is provided with markers ($21_1$-$21_N$) made on the side surface of the housing (5) of the unbalance correction mechanism and equally angularly displaced at an angle relative to each other, and with two pickups ($17_1$-$17_N$) of chambers ($7_1$-$7_N$) position and whose outputs are connected, through a switching device (22), to the inputs of a coincidence gate (16) for alternately delivering the chambers position pulses.

5. A device as claimed in claim 1 characterized in that coincidence gate (16) is made as D-flip-flops (29, 30, 31) the number of which is equal to N, the D-inputs of the D-flip-flops (29, 30, 31) being connected to the common input of the coincidence gate (16), and C-inputs are in fact other inputs of the coincidence gate (16).

6. A device as claimed in claim 1 characterized in that the coincidence gate (16) comprises N logic gates (32, 33, 34) AND-AND connected to N integrating circuits (35, 36, 37), one input of each logic gate (32, 33, 34) AND-AND being connected to the common input of the coincidence gate (16) whose other inputs are in effect the other inputs of the logic gates, while the output of each integrating circuits (35, 36, 37) in the output of the coincidence gate (16).

* * * * *